(12) United States Patent  
Gupta et al.

(10) Patent No.: US 12,047,458 B2  
(45) Date of Patent: *Jul. 23, 2024

(54) SYSTEMS AND METHODS FOR PREVENTING ABUSE OF TRAFFIC CATEGORIES AND NETWORK SLICES BY APPLICATIONS

(71) Applicant: Verizon Patent and Licensing Inc., Basking Ridge, NJ (US)

(72) Inventors: Umesh Kumar Gupta, Morris Plains, NJ (US); Lily Zhu, Parsippany, NJ (US); Muhammad Salman Nomani, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,870

(22) Filed: Aug. 8, 2023

(65) Prior Publication Data

US 2024/0089329 A1 Mar. 14, 2024

Related U.S. Application Data

(63) Continuation of application No. 17/931,610, filed on Sep. 13, 2022, now Pat. No. 11,778,041.

(51) Int. Cl.  
*H04L 67/141* (2022.01)  
*H04L 47/2475* (2022.01)  
(52) U.S. Cl.  
CPC ........ *H04L 67/141* (2013.01); *H04L 47/2475* (2013.01)

(58) Field of Classification Search  
CPC ............... H04L 67/141; H04L 47/2475; H04L 47/2441  
USPC ......................................................... 709/217  
See application file for complete search history.

(56) References Cited

U.S. PATENT DOCUMENTS

| 10,986,568 | B1* | 4/2021 | Jagannatha | ............. H04W 8/24 |
| 2020/0068473 | A1* | 2/2020 | Tang | ..................... H04L 5/0001 |
| 2020/0195495 | A1* | 6/2020 | Parker | ..................... H04L 41/40 |
| 2020/0374181 | A1* | 11/2020 | Stenberg | ............... H04W 48/18 |
| 2021/0136672 | A1* | 5/2021 | Jagannatha | ........... H04W 48/18 |

(Continued)

FOREIGN PATENT DOCUMENTS

WO 2019/024604 2/2019  
WO WO-2019024604 A1 * 2/2019 ......... H04L 41/0893

*Primary Examiner* — Ruolei Zong

(57) ABSTRACT

A user device may receive a traffic category and/or slice usage policy, and may provide a request for an application. The user device may receive the application with a traffic category and/or slice usage requirement, and may install the application on the user device. The user device may subscribe to traffic categories and/or slices, and may receive approval to utilize the traffic categories and/or slices. The user device may provide, by the application and to an operating system, a connection request for a particular traffic category and/or slice, and may determine whether the application is approved for the particular traffic category and/or slice. The device may provide, to a modem, the connection request and traffic descriptors for the particular traffic category and/or slice based on the application being approved, and may establish a protocol data unit session, for the application, utilizing the particular traffic category and/or slice.

20 Claims, 8 Drawing Sheets

(56) References Cited

U.S. PATENT DOCUMENTS

| | | | |
|---|---|---|---|
| 2021/0168705 A1* | 6/2021 | Fiorese | H04W 12/037 |
| 2021/0258385 A1* | 8/2021 | Wang | H04L 67/14 |
| 2022/0264427 A1* | 8/2022 | Ianev | H04W 8/06 |

* cited by examiner

SYSTEMS AND METHODS FOR PREVENTING ABUSE OF TRAFFIC CATEGORIES AND NETWORK SLICES BY APPLICATIONS

RELATED APPLICATION

This application is a continuation of U.S. patent application Ser. No. 17/931,610, entitled "SYSTEMS AND METHODS FOR PREVENTING ABUSE OF TRAFFIC CATEGORIES AND NETWORK SLICES BY APPLICATIONS," filed Sep. 13, 2022, which is incorporated herein by reference in its entirety.

BACKGROUND

A user device (e.g., a mobile telephone, a tablet computer, and/or the like) may download applications from a network and may utilize the applications based on connecting with the network.

DETAILED DESCRIPTION OF EXAMPLE EMBODIMENTS

Figure 1A:
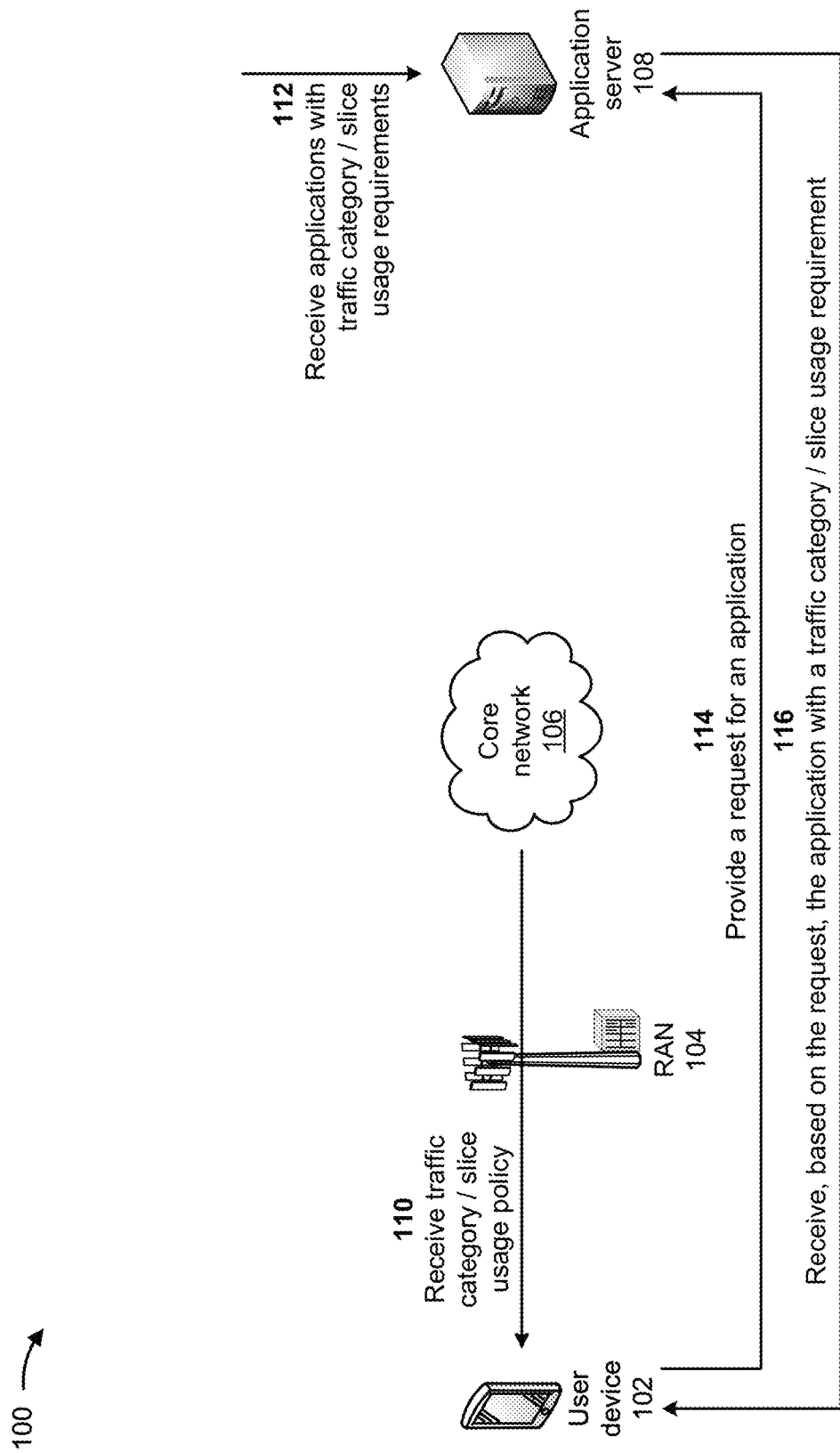
FIGS. 1A-1E are diagrams of an example associated with preventing abuse of traffic categories and network slices by applications.

The following detailed description of example implementations refers to the accompanying drawings. The same reference numbers in different drawings may identify the same or similar elements.

A user device may utilize a particular traffic category (e.g., particular quality of service (QoS), a particular traffic download data limit, a particular upload data limit, and/or the like) when accessing features of an application from a network. The user device may also utilize a particular network slice (referred to herein as a "slice") of the network when accessing the features of the application from the network. However, the user device may not be authorized to utilize the particular traffic category and/or the particular network slice. Such network applications are abusing traffic categories and/or network slices since the user device utilizing such network applications fail to be authorized to utilize the particular traffic category and/or network slice. Thus, current mechanisms for handling traffic categories and/or network slices for network applications consume computing resources (e.g., processing resources, memory resources, communication resources, and/or the like), networking resources, and/or other resources associated with failing to provide traffic categories and/or network slices to user devices authorized to utilize the traffic categories and/or network slices, erroneously providing the traffic categories and/or network slices to user devices unauthorized to utilize the traffic categories and/or network slices, handling customer complaints from customers associated with the devices authorized to utilize the traffic categories and/or network slices, and/or the like.

Some implementations described herein provide a user device that prevents abuse of traffic categories and network slices by applications. For example, the user device receives a traffic category and/or slice usage policy, and may provide a request for an application. The user device may receive, based on the request, the application with a traffic category and/or slice usage requirement, and may install the application on the user device. The user device may subscribe, by a settings application of the user device, to traffic categories and/or slices, and may receive, by the settings application, approval to utilize the traffic categories and/or slices. The user device may provide, by the application and to an operating system of the user device, a connection request for a particular traffic category and/or slice, and may determine whether the application is approved for the particular traffic category and/or slice based on the approval to utilize the traffic categories and/or slices and based on the traffic category and/or slice usage policy. The user device may provide, by the operating system and to a modem of the user device, the connection request and traffic descriptors for the particular traffic category and/or slice based on the application being approved for the particular traffic category and/or slice, and may establish a protocol data unit session, for the application, utilizing the particular traffic category and/or slice.

In this way, the user device prevents abuse of traffic categories and network slices by applications. For example, the user device may prevent abuse of traffic categories and/or slices, by applications utilized by the user device, based on authorizing the applications to access the traffic categories and/or slices. An operating system provider of the user device may approve an application as being qualified to utilize traffic categories and/or slices, and a user of the user device may provide permission for the application to utilize the traffic categories and/or slices. The user device may subscribe to the traffic categories and/or slices, and may ensure that application data traffic utilizing the traffic categories and/or slices stay within a traffic profile set by a network. Thus, the user device may conserve computing resources, networking resources, and/or other resources that would otherwise have been consumed by failing to provide traffic categories and/or network slices to user devices authorized to utilize the traffic categories and/or network slices, erroneously providing the traffic categories and/or network slices to user devices unauthorized to utilize the traffic categories and/or network slices, handling customer complaints from customers associated with the user devices authorized to utilize the traffic categories and/or network slices, and/or the like.

FIGS. 1A-1E are diagrams of an example 100 associated with preventing abuse of traffic categories and network slices by applications. As shown in FIG. 1A, the example 100 may include a user device 102, a radio access network (RAN) 104, a core network 106, and an application server 108. Further details of the user device 102, the RAN 104, the core network 106, and the application server 108 are provided elsewhere herein.

As shown in FIG. 1A, and by reference number 110, the user device 102 may receive a traffic category and/or slice usage policy. For example, the core network 106 may define the traffic category and/or slice usage policy for the user device 102 based on a subscription of the user device 102 to services provided by the core network 106. The traffic category and/or slice usage policy may include a policy that defines one or more traffic categories and/or network slices that the user device 102 may utilize to access one or more services (e.g., applications provided by the application server 108), via the RAN 104 and the core network 106. In some implementations, the traffic category and/or slice usage policy may define a quality of service to be utilized by the user device 102 for application traffic, a download data limit of the user device 102 for application traffic, an upload data limit of the user device 102 for application traffic, and/or the like. In some implementations, the core network 106 may provide, via the RAN 104, the traffic category and/or slice usage policy to the user device 102, and the user device 102 may receive the traffic category and/or slice usage policy. Alternatively, the user device 102 may provide, to the core network 106, a request for traffic category and/or slice usage policy, and the core network 106 may provide the traffic category and/or slice usage policy to the user device 102 based on the request.

As further shown in FIG. 1A, and by reference number 112, the application server 108 may receive applications with traffic category and/or slice usage requirements. For example, a vendor of an operating system of the user device 102 may provide developer guidelines for using traffic categories and/or slices to developers of applications. The developer guidelines may include a mapping between traffic descriptors (e.g., a connection capabilities traffic descriptor) and the traffic categories and/or slices, and may include associated application programming interfaces (APIs) to be utilized by the developers. The developers may create, based on the developer guidelines, applications with traffic category and/or slice usage requirements of the applications. The developers may submit the applications to an application store that publishes applications for the user device 102. The application store support team may verify whether the applications satisfy the traffic category and/or slice usage requirements. If the applications satisfy the traffic category and/or slice usage requirements, the application store support team may approve the applications and may provide the applications to the application server 108. The application server 108 may receive the applications with traffic category and/or slice usage requirements from the application store support team, and may store the applications in a data structure (e.g., a database, a table, a list, and/or the like) associated with the application server 108.

As further shown in FIG. 1A, and by reference number 114, the user device 102 may provide a request for an application. For example, a user may utilize the user device 102 to browse the applications provided by the application server 108. The user may cause the user device 102 to generate a request for an application (e.g., of the applications), and to provide the request to the application server 108.

As further shown in FIG. 1A, and by reference number 116, the user device 102 may receive, based on the request, the application with a traffic category and/or slice usage requirement. For example, the application server 108 may receive the request for the application from the user device 102, and may provide (e.g., via a download) the application to the user device 102 based on the request for the application. The user device 102 may receive (e.g., download) the application from the application server 108, and may store the application in a data structure associated with the user device 102. The application may be associated with a traffic category and/or slice usage.

Figure 1B:
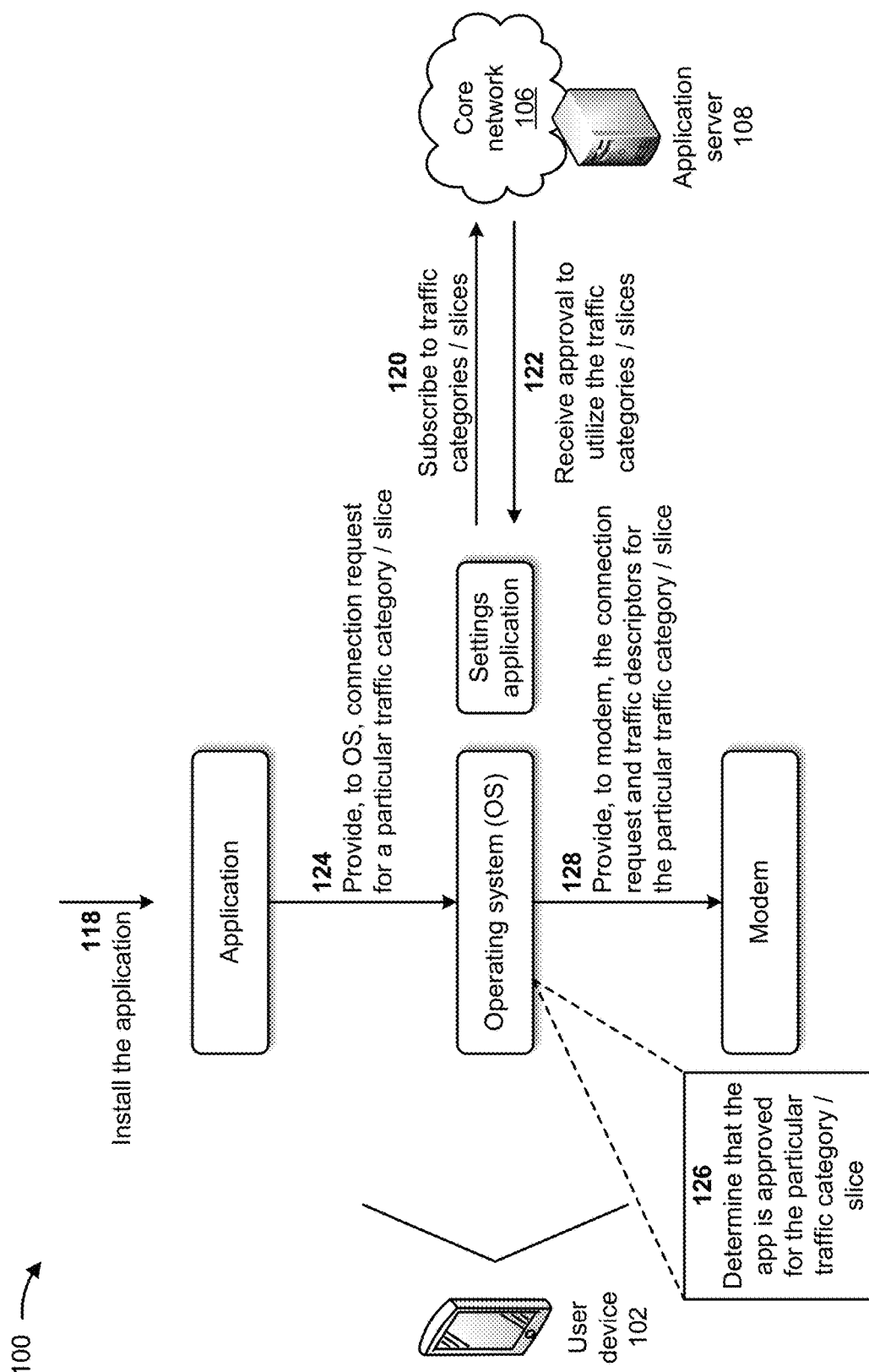

As shown in FIG. 1B, and by reference number 118, the user device 102 may install the application. For example, the user may cause the user device 102 to install the application with the traffic category and/or slice usage. In some implementations, the application server 108 and/or the application store may recommend to the user of the user device 102 the traffic categories and/or slices required for best performance of the application. In some implementations, after installing the application, the user device 102 may inform the user that the application requires access to particular traffic categories and/or slices for optimal performance, and may provide a link (e.g., a uniform resource locator (URL)) to subscribe to the particular traffic categories and/or slices.

As further shown in FIG. 1B, and by reference number 120, a settings application of the user device 102 may subscribe to traffic categories and/or slices. For example, the user device 102 may include a settings application that enables the user device 102 to interact with a portal provided by a provider of the core network 106, and to subscribe to traffic categories and/or slices desired by the user. In some implementations, the user device 102 may provide a link to the portal in a user interface of the user device 102 for user convenience. The user device 102 may provide, to the core network 106, a subscription request for the traffic categories and/or slices.

As further shown in FIG. 1B, and by reference number 122, the settings application of the user device 102 may receive approval to utilize the traffic categories and/or slices. For example, the core network 106 may receive, from the user device 102, the subscription request for the traffic categories and/or slices, and may determine whether the user device 102 is approved to utilize the traffic categories and/or slices based on the subscription request and a subscription plan associated with the user of the user device 102. If the core network 106 approves the utilization of the traffic categories and/or slices, the core network 106 may provide approval to utilize the traffic categories and/or slices to the user device 102, and the user device 102 may receive the approval to utilize the traffic categories and/or slices. The approval to utilize the traffic categories and/or slices may include appropriate UE route selection policy (URSP) rules for the user device 102 to utilize the traffic categories and/or slices. In some implementations, the user of the user device 102 may permit the application to use any or all of the traffic categories and/or slices, irrespective of whether the user device 102 has subscribed to the traffic categories and/or slices.

As further shown in FIG. 1B, and by reference number 124, the application of the user device 102 may provide, to an operating system of the user device 102, a connection request for a particular traffic category and/or slice. For example, the user may cause the user device 102 to execute the application (e.g., based on selection of the application from a user interface). When executed, the application may generate the connection request for the particular traffic category and/or slice (e.g., for provisions of the application to the user device 102). The application may provide, to the operating system, the connection request for the particular traffic category and/or slice. In some implementations, the connection request may include appropriate traffic descriptors associated with the particular traffic category and/or slice.

As further shown in FIG. 1B, and by reference number 126, the operating system of the user device 102 may determine that the application is approved for the particular traffic category and/or slice. For example, the operating system may receive the connection request and may determine whether the application is approved for the particular traffic category and/or slice. In some implementations, the operating system may determine whether the application is approved for the particular traffic category and/or slice based on whether the application store support team verified that the application satisfies the traffic category and/or slice usage requirements, and based on whether the user of the user device 102 permitted the application to use the particular traffic category and/or slice. In some implementations, the operating system may determine that the application is approved for the particular traffic category and/or slice based on the application store support team verifying the application, and based on the user of the user device 102 permitting the application to use the particular traffic category and/or slice.

As further shown in FIG. 1B, and by reference number 128, the operating system of the user device 102 may provide, to a modem of the user device 102, the connection request and traffic descriptors (e.g., the URSP rules) for the particular traffic category and/or slice based on the application being approved for the particular traffic category and/or slice. For example, if the operating system determines that the application is approved for the particular traffic category and/or slice, the operating system may provide, to the modem, the connection request and the traffic descriptors for the particular traffic category and/or slice. The modem may receive the connection request and the traffic descriptors for the particular traffic category and/or slice.

Figure 1C:
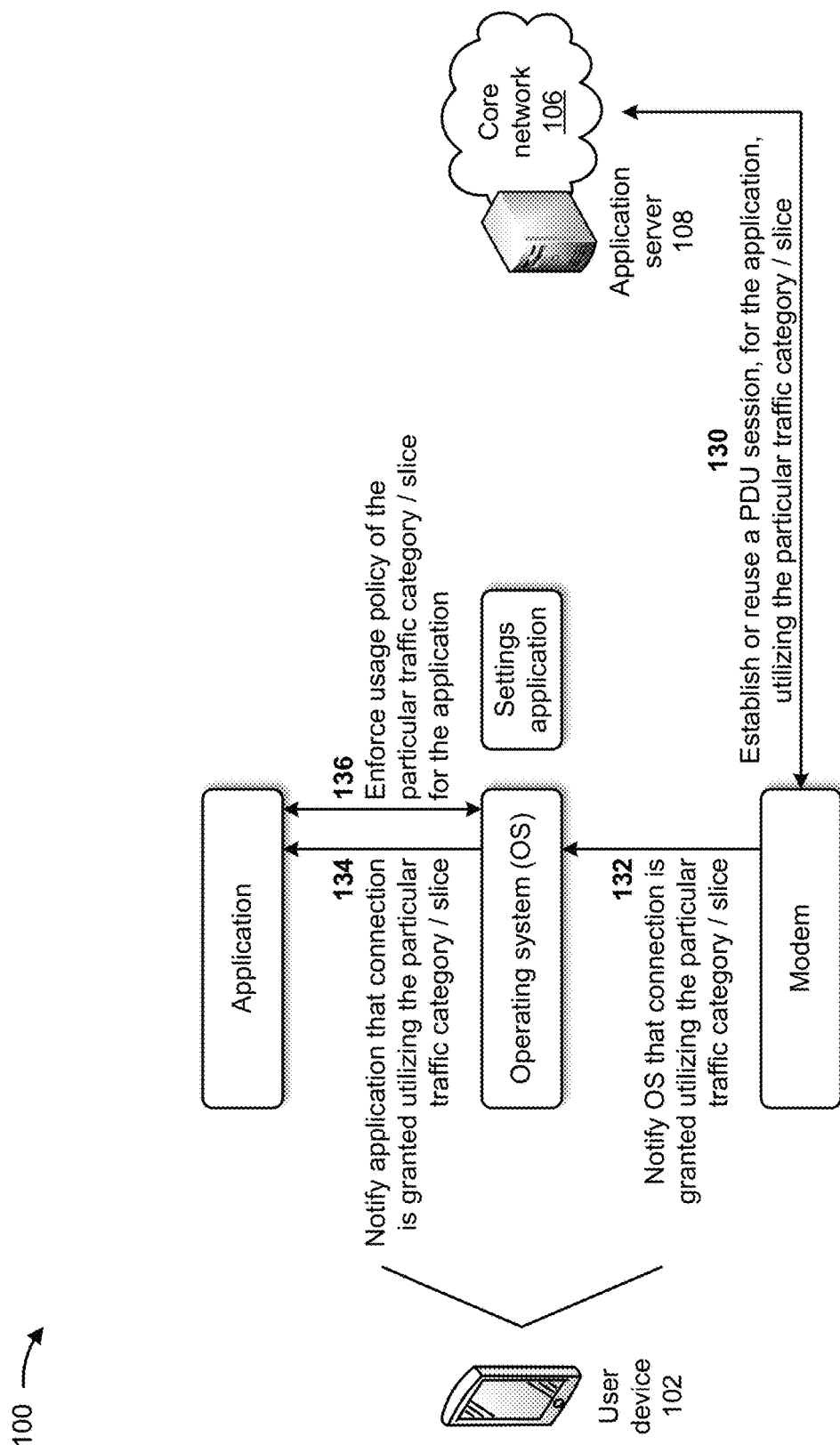

As shown in FIG. 1C, and by reference number 130, the modem of the user device 102 may establish or reuse a protocol data unit (PDU) session, for the application, utilizing the particular traffic category and/or slice. For example, based on the connection request, the modem may establish a new PDU session or reuse an existing PDU session between the user device 102 and the core network 106. The modem may utilize the traffic descriptors (e.g., the URSP rules) for the particular traffic category and/or slice for the PDU session so that the application may utilize the particular traffic category and/or slice.

As further shown in FIG. 1C, and by reference number 132, the modem of the user device 102 may notify the operating system that a connection is granted utilizing the particular traffic category and/or slice. For example, when the PDU session is established and the modem is communicating with the application server 108, via the core network 106, the modem may generate a notification indicating that the connection is granted utilizing the particular traffic category and/or slice. The modem may provide, to the operating system, the notification indicating that the connection is granted utilizing the particular traffic category and/or slice. The operating system may receive the notification indicating that the connection is granted utilizing the particular traffic category and/or slice.

As further shown in FIG. 1C, and by reference number 134, the operating system of the user device 102 may notify the application that the connection is granted utilizing the particular traffic category and/or slice. For example, when the operating system receives the notification indicating that the connection is granted utilizing the particular traffic category and/or slice, and the operating system may provide, to the application, the notification indicating that the connection is granted utilizing the particular traffic category and/or slice.

As further shown in FIG. 1C, and by reference number 136, the operating system of the user device 102 may enforce a usage policy of the particular traffic category and/or slice for the application. For example, the operating system may utilize the traffic category and/or slice usage policy, previously received from the core network 106, to enforce a usage policy for the particular traffic category and/or slice for the application. This may ensure that the application is utilizing a particular traffic category and/or slice that is approved by the core network 106 for the user device 102.

Figure 1D:
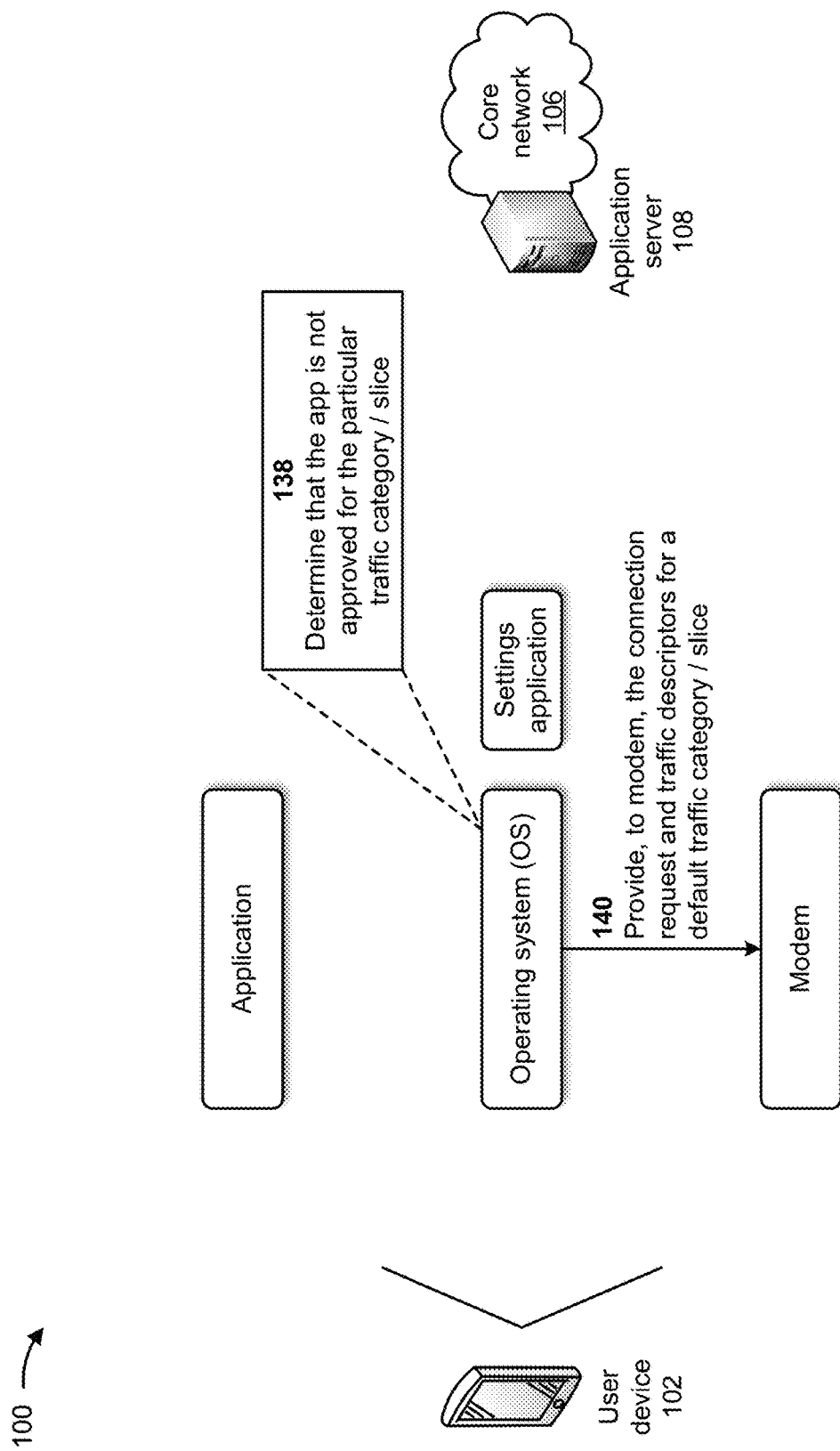

As shown in FIG. 1D, and by reference number 138, alternatively, the operating system of the user device 102 may determine that the application is not approved for the particular traffic category and/or slice. For example, the operating system may determine that the application is not approved for the particular traffic category and/or slice based on the application store support team not verifying that the application satisfies the traffic category and/or slice usage requirements, based on the user of the user device 102 not permitting the application to use the particular traffic category and/or slice, or based on the user device 102 not subscribing to the particular traffic category and/or slice. In such instances, the operating system may determine that the application is to utilize a default traffic category and/or slice.

As further shown in FIG. 1D, and by reference number 140, the operating system of the user device 102 may provide, to the modem, the connection request and traffic descriptors for a default traffic category and/or slice based on the application not being approved for the particular traffic category and/or slice. For example, if the operating system determines that the application is not approved for the particular traffic category and/or slice, the operating system may provide, to the modem, the connection request and the traffic descriptors for the default traffic category and/or slice. The modem may receive the connection request and the traffic descriptors for the default traffic category and/or slice.

Figure 1E:
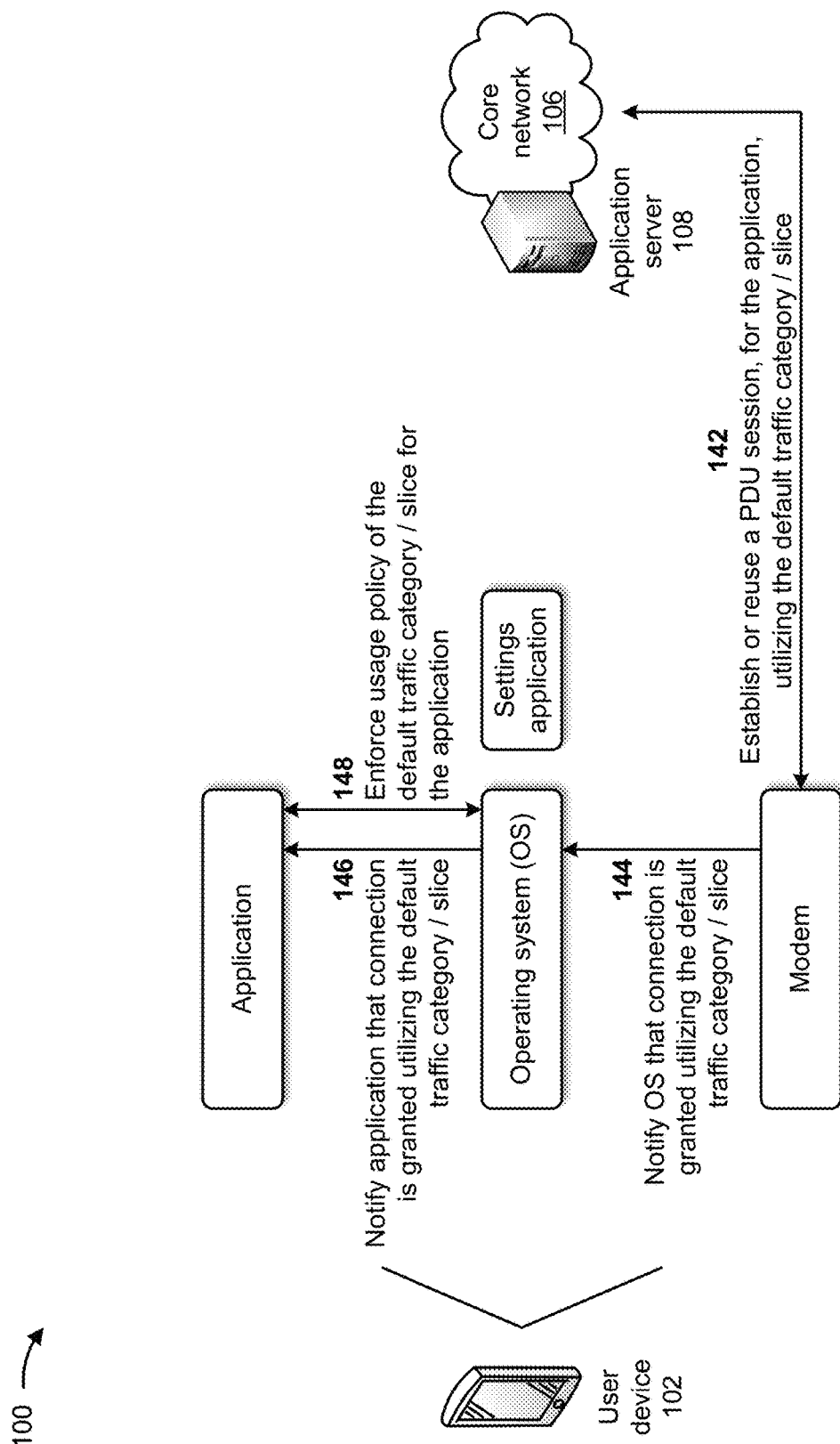

As shown in FIG. 1E, and by reference number 142, the modem of the user device 102 may establish or reuse a PDU session, for the application, utilizing the default traffic category and/or slice. For example, based on the connection request, the modem may establish a new PDU session or reuse an existing PDU session between the user device 102 and the core network 106. The modem may utilize the traffic descriptors (e.g., the URSP rules) for the default traffic category and/or slice for the PDU session so that the application may utilize the default traffic category and/or slice.

As further shown in FIG. 1E, and by reference number 144, the modem of the user device 102 may notify the operating system that a connection is granted utilizing the default traffic category and/or slice. For example, when the PDU session is established and the modem is communicating with the application server 108, via the core network 106, the modem may generate a notification indicating that the connection is granted utilizing the default traffic category and/or slice. The modem may provide, to the operating system, the notification indicating that the connection is granted utilizing the default traffic category and/or slice. The operating system may receive the notification indicating that the connection is granted utilizing the default traffic category and/or slice.

As further shown in FIG. 1E, and by reference number 146, the operating system of the user device 102 may notify the application that the connection is granted utilizing the default traffic category and/or slice. For example, when the operating system receives the notification indicating that the connection is granted utilizing the default traffic category and/or slice, the operating system may provide, to the application, the notification indicating that the connection is granted utilizing the default traffic category and/or slice.

As further shown in FIG. 1E, and by reference number 148, the operating system of the user device 102 may enforce a usage policy of the default traffic category and/or slice for the application. For example, the operating system may utilize the traffic category and/or slice usage policy, previously received from the core network 106, to enforce a usage policy for the default traffic category and/or slice for the application. This may ensure that the application is utilizing a default traffic category and/or slice that is approved by the core network 106 for the user device 102.

In this way, the user device 102 prevents abuse of traffic categories and network slices by applications. For example, the user device 102 may prevent abuse of traffic categories and/or slices, by applications utilized by the user device 102, based authorizing the applications to access the traffic categories and/or slices. An operating system provider of the user device 102 may approve an application as being qualified to utilize traffic categories and/or slices, and a user of the user device 102 may provide permission for the application to utilize the traffic categories and/or slices. The user device 102 may subscribe to the traffic categories and/or slices, and may ensure that application data traffic utilizing the traffic categories and/or slices satisfies a traffic profile set by a network. Thus, the user device 102 may conserve computing resources, networking resources, and/or other resources that would otherwise have been consumed by failing to provide traffic categories and/or network slices to user devices 102 authorized to utilize the traffic categories and/or network slices, erroneously providing the traffic categories and/or network slices to user devices 102 unauthorized to utilize the traffic categories and/or network slices, handling customer complaints from customers associated with the user devices 102 authorized to utilize the traffic categories and/or network slices, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
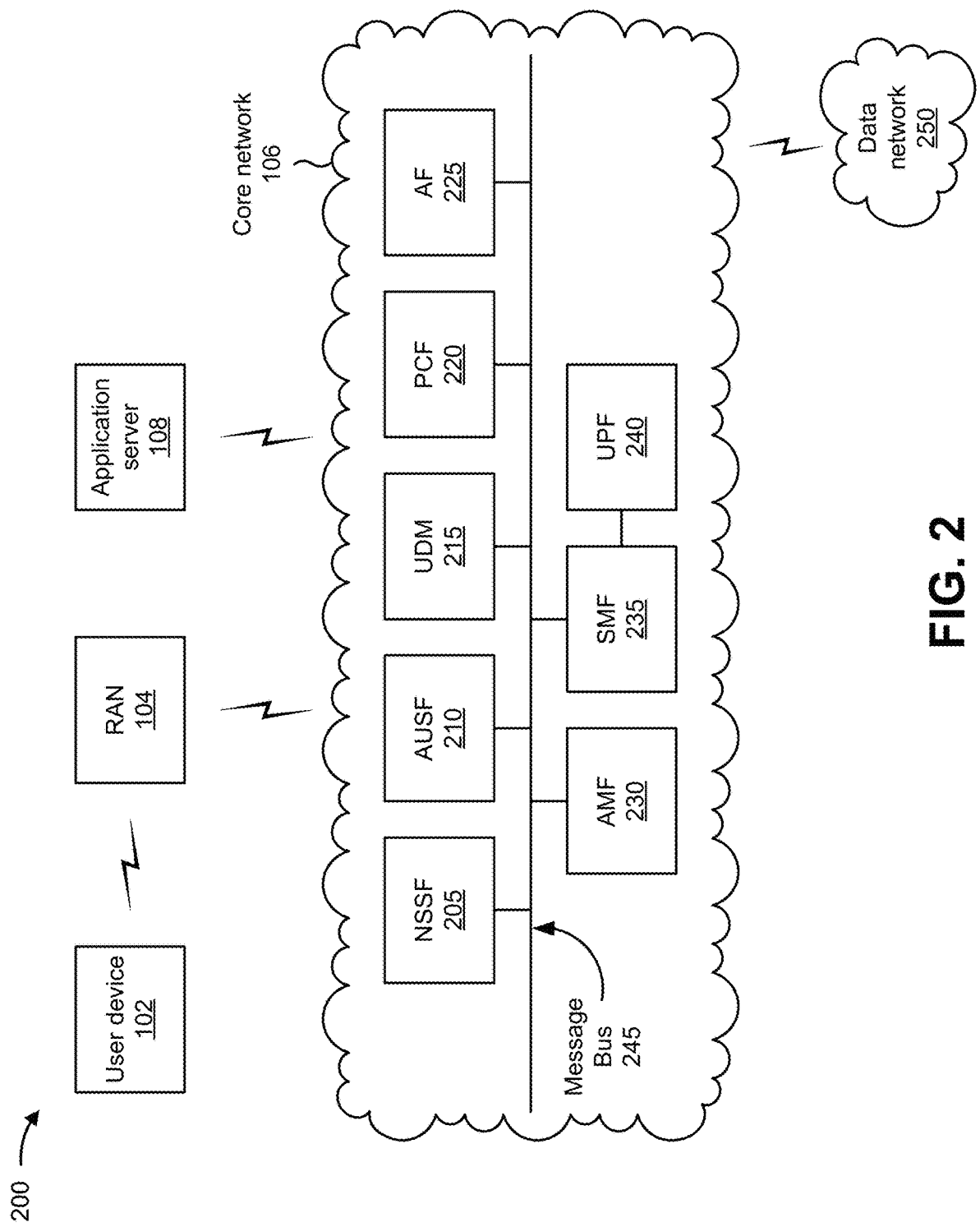
FIG. 2 is a diagram of example environments in which systems and/or methods described herein may be implemented.

FIG. 2 is a diagram of an example environment 200 in which systems and/or methods described herein may be implemented. As shown in FIG. 2, the example environment 200 may include the user device 102, the RAN 104, the core network 106, the application server 108, and a data network 250. Devices and/or networks of the example environment 200 may interconnect via wired connections, wireless connections, or a combination of wired and wireless connections.

The user device 102 includes one or more devices capable of receiving, generating, storing, processing, and/or providing information, such as information described herein. For example, the user device 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 104 may support, for example, a cellular radio access technology (RAT). The RAN 104 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 102. The RAN 104 may transfer traffic between the user device 102 (e.g., using a cellular RAT), one or more base stations (e.g., using a wireless interface or a backhaul interface, such as a wired backhaul interface), and/or the core network 106. The RAN 104 may provide one or more cells that cover geographic areas.

In some implementations, the RAN 104 may perform scheduling and/or resource management for the user device 102 covered by the RAN 104 (e.g., the user device 102 covered by a cell provided by the RAN 104). In some implementations, the RAN 104 may be controlled or coordinated by a network controller, which may perform load balancing, network-level configuration, and/or other operations. The network controller may communicate with the RAN 104 via a wireless or wireline backhaul. In some implementations, the RAN 104 may include a network controller, a self-organizing network (SON) module or component, or a similar module or component. In other words, the RAN 104 may perform network control, scheduling, and/or network management functions (e.g., for uplink, downlink, and/or sidelink communications of the user device 102 covered by the RAN 104).

The application server 108 may include one or more devices capable of receiving, generating, storing, processing, providing, and/or routing information, as described elsewhere herein. The application server 108 may include a communication device and/or a computing device. For example, the application server 108 may include a server, such as an application server, a client server, a web server, a database server, a host server, a proxy server, a virtual server (e.g., executing on computing hardware), or a server in a cloud computing system. In some implementations, the application server 108 may include computing hardware used in a cloud computing environment.

In some implementations, the core network 106 may include an example functional architecture in which systems and/or methods described herein may be implemented. For example, the core network 106 may include an example architecture of a 5G next generation (NG) core network included in a 5G wireless telecommunications system. While the example architecture of the core network 106 shown in FIG. 3 may be an example of a service-based architecture, in some implementations, the core network 106 may be implemented as a reference-point architecture and/or a 4G core network, among other examples.

Figure 3:
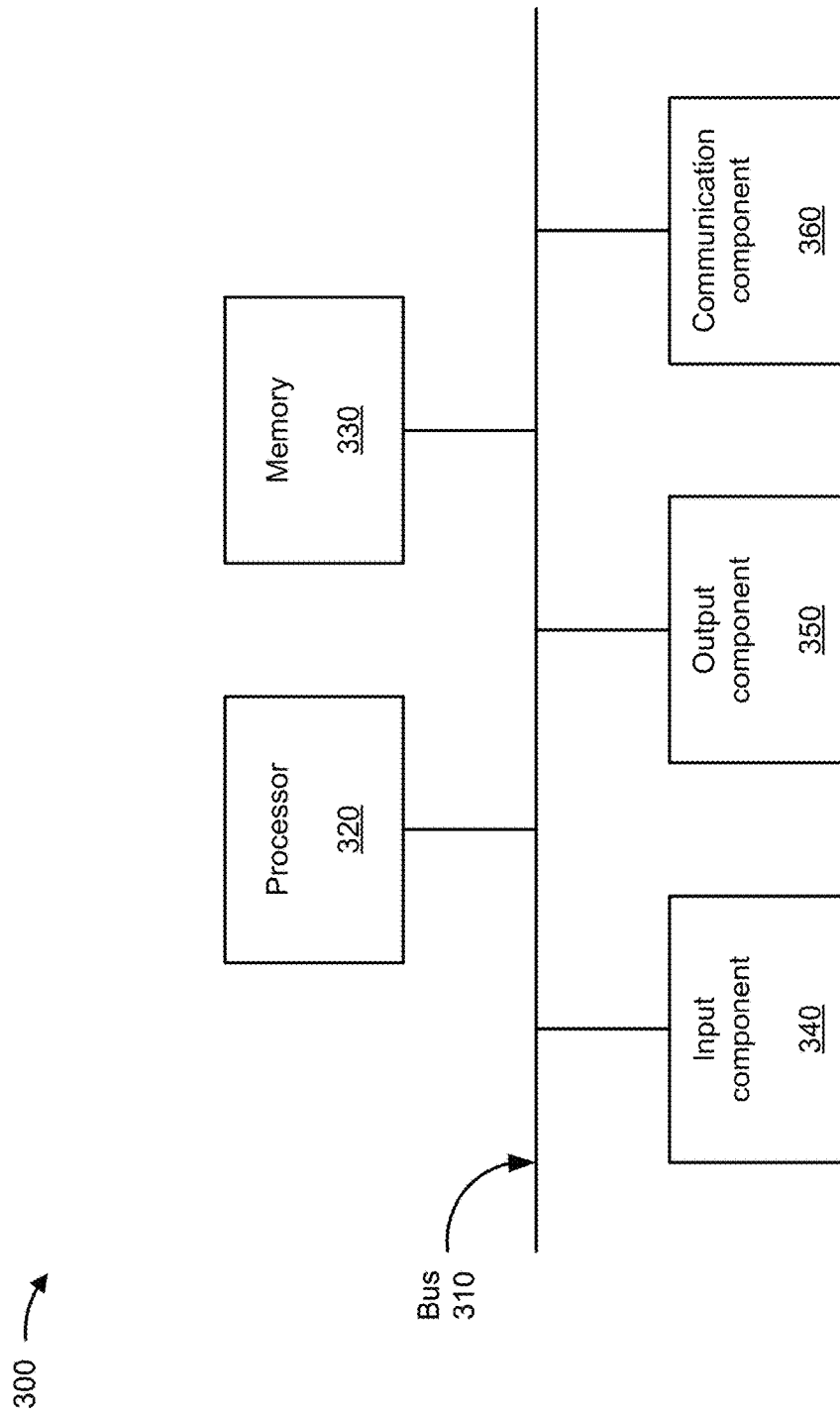
FIG. 3 is a diagram of example components of one or more devices of FIG. 2.

As shown in FIG. 3, the core network 106 may include a number of functional elements. The functional elements may include, for example, a network slice selection function (NSSF) 205, an authentication server function (AUSF) 210, a unified data management (UDM) component 215, a policy control function (PCF) 220, an application function (AF) 225, an access and mobility management function (AMF) 230, a session management function (SMF) 235, and/or a user plane function (UPF) 240. The functional elements may be communicatively connected via a message bus 245. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 102. By providing network slicing, the NSSF 205 allows an operator to deploy multiple substantially independent end-to-end networks potentially with the same infrastructure. In some implementations, each slice may be customized for different services.

The AUSF 210 includes one or more devices that act as an authentication server and support the process of authenticating the user device 102 in the wireless telecommunications system.

The UDM 215 includes one or more devices that store user data and profiles in the wireless telecommunications system. The UDM 215 may be used for fixed access and/or mobile access in the core network 106.

The PCF 220 includes one or more devices that provide a policy framework that incorporates network slicing, roaming, packet processing, and/or mobility management, among other examples.

The AF 225 includes one or more devices that support application influence on traffic routing, access to a network exposure function (NEF), and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The message bus 245 represents a communication structure for communication among the functional elements. In other words, the message bus 245 may permit communication between two or more functional elements.

The data network 250 includes one or more wired and/or wireless data networks. For example, the data network 250 may include an IMS, a PLMN, a LAN, a WAN, a MAN, a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example environment 200 may perform one or more functions described as being performed by another set of devices of the example environment 200.

FIG. 3 is a diagram of example components of a device 300, which may correspond to the user device 102, the RAN 104, the application server 108, the NSSF 205, the AUSF 210, the UDM 215, the PCF 220, the AF 225, the AMF 230, the SMF 235, and/or the UPF 240. In some implementations, the user device 102, the RAN 104, the application server 108, NSSF 205, the AUSF 210, the UDM 215, the PCF 220, the AF 225, the AMF 230, the SMF 235, and/or the UPF 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 1, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
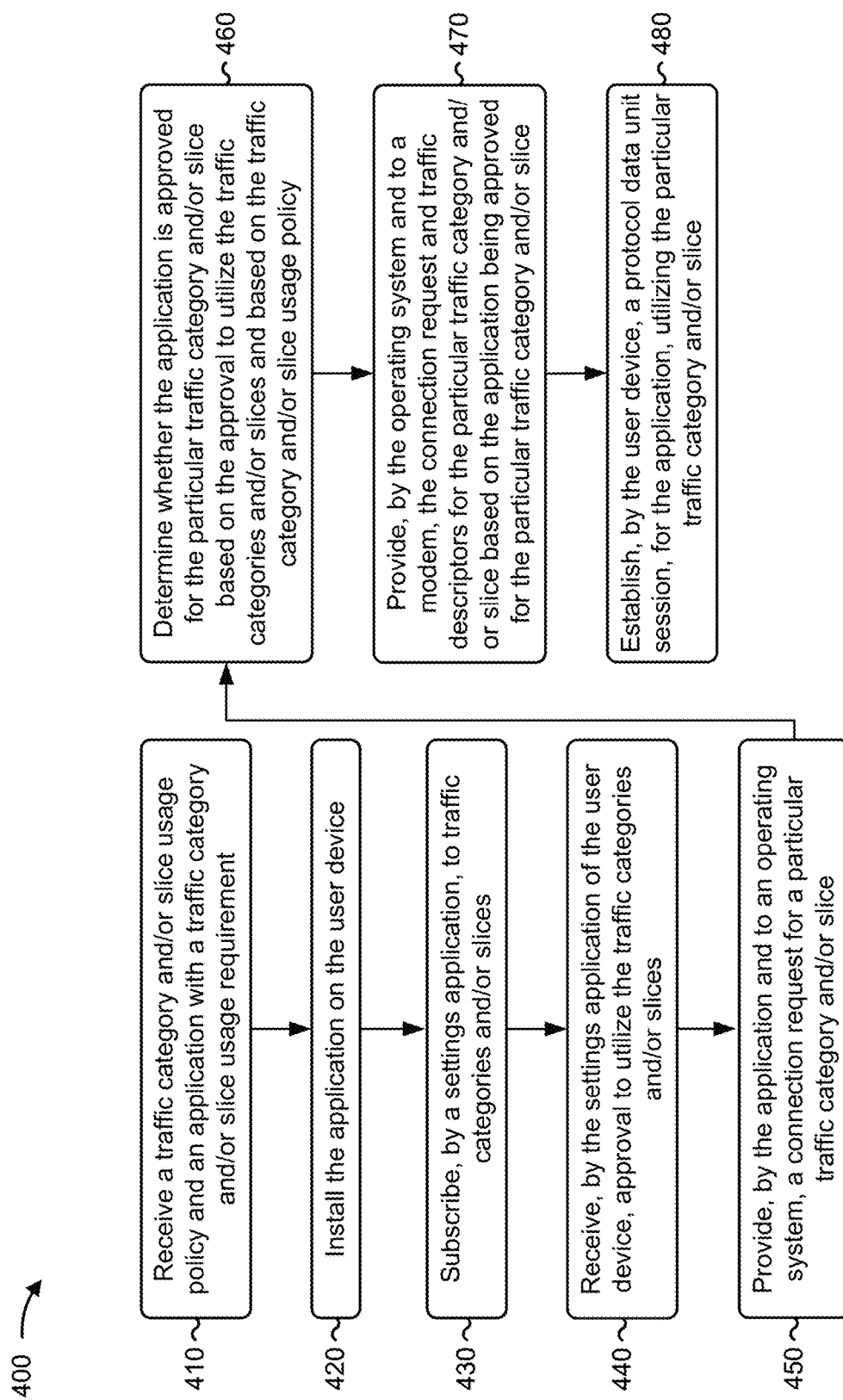
FIG. 4 is a flowchart of an example process for preventing abuse of traffic categories and network slices by applications.

FIG. 4 is a flowchart of an example process 400 for preventing abuse of traffic categories and network slices by applications. In some implementations, one or more process blocks of FIG. 4 may be performed by a user device (e.g., the user device 102). In some implementations, one or more process blocks of FIG. 4 may be performed by another device or a group of devices separate from or including the user device, such as an application server (e.g., the application server 108). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a traffic category and/or slice usage policy and an application with a traffic category and/or slice usage requirement (block 410). For example, the user device may receive a traffic category and/or slice usage policy and an application with a traffic category and/or slice usage requirement, as described above. In some implementations, the traffic category and/or slice usage policy defines one or more of a quality of service to be utilized by the user device for application traffic, a download data limit for application traffic, or an upload data limit for application traffic. In some implementations, receiving the traffic category and/or slice usage policy includes receiving the traffic category and/or slice usage policy from a core network.

As further shown in FIG. 4, process 400 may include installing the application on the user device (block 420). For example, the user device may install the application on the user device, as described above.

As further shown in FIG. 4, process 400 may include subscribing to traffic categories and/or slices (block 430). For example, the user device may subscribe to traffic categories and/or slices, as described above.

As further shown in FIG. 4, process 400 may include receiving approval to utilize the traffic categories and/or slices (block 440). For example, the user device may receive approval to utilize the traffic categories and/or slices, as described above.

As further shown in FIG. 4, process 400 may include providing, to an operating system, a connection request for a particular traffic category and/or slice (block 450). For example, the user device may provide, to an operating system of the user device, a connection request for a particular traffic category and/or slice, as described above.

As further shown in FIG. 4, process 400 may include determining whether the application is approved for the particular traffic category and/or slice based on the approval to utilize the traffic categories and/or slices and based on the traffic category and/or slice usage policy (block 460). For example, the user device may determine whether the application is approved for the particular traffic category and/or slice based on the approval to utilize the traffic categories and/or slices and based on the traffic category and/or slice usage policy, as described above. In some implementations, determining whether the application is approved for the particular traffic category and/or slice includes determining whether the application is approved for the particular traffic category and/or slice based on the traffic category and/or slice usage requirement.

As further shown in FIG. 4, process 400 may include providing, to a modem, the connection request and traffic descriptors for the particular traffic category and/or slice based on the application being approved for the particular traffic category and/or slice (block 470). For example, the user device may provide, to a modem of the user device, the connection request and traffic descriptors for the particular traffic category and/or slice based on the application being approved for the particular traffic category and/or slice, as described above.

As further shown in FIG. 4, process 400 may include establishing a protocol data unit session, for the application, utilizing the particular traffic category and/or slice (block 480). For example, the user device may establish a protocol data unit session, for the application, utilizing the particular traffic category and/or slice, as described above.

In some implementations, process 400 includes determining that the application is not approved for the particular traffic category and/or slice, and providing, to the modem, the connection request and traffic descriptors for a default traffic category and/or slice based on the application not being approved for the particular traffic category and/or slice and based on the traffic category and/or slice usage policy. In some implementations, process 400 includes establishing the protocol data unit session, for the application, utilizing the default traffic category and/or slice. In some implementations, process 400 includes notifying the operating system that a connection is granted utilizing the default traffic category and/or slice. In some implementations, process 400 includes notifying the application that the connection is granted utilizing the default traffic category and/or slice. In some implementations, process 400 includes enforcing a usage policy of the default traffic category and/or slice for the application.

In some implementations, process 400 includes notifying the operating system that a connection is granted utilizing the particular traffic category and/or slice. In some implementations, process 400 includes notifying the application that the connection is granted utilizing the particular traffic category and/or slice. In some implementations, process 400 includes enforcing a usage policy of the particular traffic category and/or slice for the application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    obtaining, by a settings application of a device, approval to utilize traffic categories or slices;
    providing, by an application, associated with a traffic category or slice usage requirement, and to an operating system of the device, a connection request for a particular traffic category or slice; and
    determining, by the device, whether the application is approved for the particular traffic category or slice based on the approval to utilize the traffic categories or slices and based on a traffic category or slice usage policy.

2. The method of claim 1, wherein the traffic category or slice usage policy is defined based on a subscription of the device to services provided by a network.

3. The method of claim 1, wherein the traffic category or slice usage policy is associated with one or more of:
    a quality of service to be utilized by the device,
    a download data limit of the device, or
    an upload data limit of the device.

4. The method of claim 1, further comprising:
    providing, by the device, a request for the traffic category or slice usage policy, and
    obtaining, by the device and based on the request, the traffic category or slice usage policy.

5. The method of claim 1, wherein the traffic category or slice usage requirement is based on developer guidelines that map between traffic descriptors and the traffic categories or slices.

6. The method of claim 1, further comprising:
    installing the application; and
    obtaining, based on installing the application, a recommendation that the application requires access to the particular traffic category or slice.

7. The method of claim 1, wherein the settings application enables the device to interact with a portal provided by a provider of a core network.

8. A device, comprising:
    one or more processors configured to:
        obtain, by a settings application of the device, approval to utilize traffic categories or slices;
        provide, by an application, associated with a traffic category or slice usage requirement, and to an operating system of the device, a connection request for a particular traffic category or slice; and
        determine whether the application is approved for the particular traffic category or slice based on the approval to utilize the traffic categories or slices and based on a traffic category or slice usage policy.

9. The device of claim 8, wherein the settings application enables the device to subscribe to one or more of the traffic categories or slices.

10. The device of claim 8, wherein the approval to utilize the traffic categories or slices comprises user equipment route selection policy rules for the device to utilize the traffic categories or slices.

11. The device of claim 8, wherein the one or more processors, to provide the connection request for the particular traffic category or slice, are configured to:
    execute the application; and
    generate the connection request for the particular traffic category or slice based on executing the application.

12. The device of claim 8, wherein the connection request for the particular traffic category or slice includes traffic descriptors associated with the particular traffic category or slice.

13. The device of claim 8, wherein the one or more processors, to determine whether the application is approved for the particular traffic category or slice, are configured to:
  determine whether the application is approved for the particular traffic category or slice based on an application store support team verifying the application.

14. The device of claim 8, wherein the settings application enables the device to interact with a portal provided by a provider of a core network.

15. A non-transitory computer-readable medium storing a set of instructions, the set of instructions comprising:
  one or more instructions that, when executed by one or more processors of a device, cause the device to:
    obtain, by a settings application of the device, approval to utilize traffic categories or slices;
    provide, by an application associated with a traffic category or slice usage requirement, and to an operating system of the device, a connection request for a particular traffic category or slice; and
    determine whether the application is approved for the particular traffic category or slice based on the approval to utilize the traffic categories or slices and based on a traffic category or slice usage policy.

16. The non-transitory computer-readable medium of claim 15, wherein the one or more instructions, that cause the device to determine whether the application is approved for the particular traffic category or slice, cause the device to:
  determine whether the application is approved for the particular traffic category or slice based on a user of the device permitting the application to use the particular traffic category or slice.

17. The non-transitory computer-readable medium of claim 15, wherein the one or more instructions further cause the device to:
  provide, via the operating system and to a modem of the device, the connection request and traffic descriptors for the particular traffic category or slice based on the application being approved for the particular traffic category or slice.

18. The non-transitory computer-readable medium of claim 15, wherein the one or more instructions further cause the device to:
  establish or reuse a protocol data unit session, for the application, utilizing the particular traffic category or slice.

19. The non-transitory computer-readable medium of claim 18, wherein the one or more instructions, to cause the device to establish or reuse the protocol data unit session, cause the device to:
  utilize traffic descriptors for the particular traffic category or slice for the protocol data unit session.

20. The non-transitory computer-readable medium of claim 18, wherein the one or more instructions further cause the device to:
  notify, by a modem of the device, the operating system that a connection is granted utilizing the particular traffic category or slice.

* * * * *